(12) United States Patent
Sako et al.

(10) Patent No.: US 8,000,218 B2
(45) Date of Patent: Aug. 16, 2011

(54) RECORDING MEDIUM, RECORDING METHOD, AND RECORDING APPARATUS

(75) Inventors: Yoichiro Sako, Tokyo (JP); Tatsuya Inokuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 1199 days.

(21) Appl. No.: 10/500,151

(22) PCT Filed: Jan. 22, 2003

(86) PCT No.: PCT/JP03/00525
§ 371 (c)(1),
(2), (4) Date: Jul. 12, 2004

(87) PCT Pub. No.: WO03/065367
PCT Pub. Date: Aug. 7, 2003

(65) Prior Publication Data
US 2005/0105455 A1 May 19, 2005

(30) Foreign Application Priority Data
Jan. 31, 2002 (JP) .................................. 2002-023479

(51) Int. Cl.
*G11B 7/24* (2006.01)
(52) U.S. Cl. ................ 369/275.3; 369/53.22; 369/30.25
(58) Field of Classification Search ............... 369/30.07, 369/30.04, 30.25, 53.21, 59.25, 47.12, 83, 369/84, 275.3, 275.1, 47.21, 59.1, 30.1, 47.13, 369/53.24, 111, 53.22; 380/203; 386/96
See application file for complete search history.

(56) References Cited

U.S. PATENT DOCUMENTS

| | | | | |
|---|---|---|---|---|
| 4,996,679 A | * | 2/1991 | Yoshio | 369/30.25 |
| 5,153,861 A | * | 10/1992 | Maeda et al. | 369/30.07 |
| 5,592,450 A | * | 1/1997 | Yonemitsu et al. | 386/96 |
| 5,737,287 A | | 4/1998 | Lee | |
| 5,859,821 A | * | 1/1999 | Koya et al. | 369/30.25 |

(Continued)

FOREIGN PATENT DOCUMENTS
CN 1153978 9/1997
(Continued)

OTHER PUBLICATIONS
Office Action issued Dec. 6, 2010 in EP Application No. 03 734 825.7.
(Continued)

*Primary Examiner* — Hoa T Nguyen
*Assistant Examiner* — Kim-Kwok Chu
(74) *Attorney, Agent, or Firm* — Oblon, Spivak, McClelland, Maier & Neustadt, L.L.P.

(57) ABSTRACT

Payload 0 as a header is recorded to a head of a UDI area. In the case of recording payload 0 and other payloads, each of them is quintuple-recorded in order to take a countermeasure against errors. Other payloads such as payload 1 and the like are recorded after payload 0. In the case of quintuple-recording, the payloads of the same payload number are collectively quintuple-recorded. AUDI is recorded from a position after one second from start time S. The payloads are arranged in positions at 12-frame intervals. Thus, the five data which is multiple-written are not arranged in the radial direction of a disc but widely distributed onto tracks. Error resistance is improved. An interval of data is set to an optimum value in accordance with the number of multiple-writing times, a linear velocity, a recording position on the disc, and the like.

12 Claims, 15 Drawing Sheets

U.S. PATENT DOCUMENTS

| | | | |
|---|---|---|---|
| 5,870,375 A * | 2/1999 | Maeda et al. | 369/275.3 |
| 6,023,384 A | 2/2000 | Anderson et al. | |
| 6,072,759 A * | 6/2000 | Maeda et al. | 369/59.25 |
| 6,108,423 A * | 8/2000 | Sako et al. | 380/203 |
| 6,370,090 B1 * | 4/2002 | Verbakel et al. | 369/30.04 |
| 6,580,684 B2 * | 6/2003 | Miyake et al. | 369/275.3 |
| 6,683,835 B2 * | 1/2004 | Ko et al. | 369/53.21 |
| 6,804,188 B1 * | 10/2004 | Shishido et al. | 369/275.3 |

FOREIGN PATENT DOCUMENTS

| | | |
|---|---|---|
| EP | 1058254 | 4/2000 |
| JP | S55-084052 | 6/1980 |
| JP | H04-372776 | 12/1992 |
| JP | 5-20792 | 1/1993 |
| JP | 05-020792 | 1/1993 |
| JP | 5-290515 | 11/1993 |
| JP | 05-290515 | 11/1993 |
| JP | 6-131817 | 5/1994 |
| JP | 6-349248 | 12/1994 |
| JP | 08-147766 | 6/1996 |
| JP | 08-153331 | 6/1996 |
| JP | 9-73634 | 3/1997 |
| JP | 2001-110003 | 4/2001 |
| JP | 2001-202694 | 7/2001 |
| JP | 2001-344765 | 12/2001 |
| WO | 98/47144 A1 | 10/1998 |
| WO | 00/67257 | 11/2000 |
| WO | 01/15164 | 3/2001 |

OTHER PUBLICATIONS

Office Action mailed Aug. 31, 2007, in Chinese Patent Application No. 03803034.9 (with English Translation).

Office Action mailed Mar. 20, 2010, in Chinese Patent Application No. 03803034.9 (with English Translation).

* cited by examiner

Fig. 3
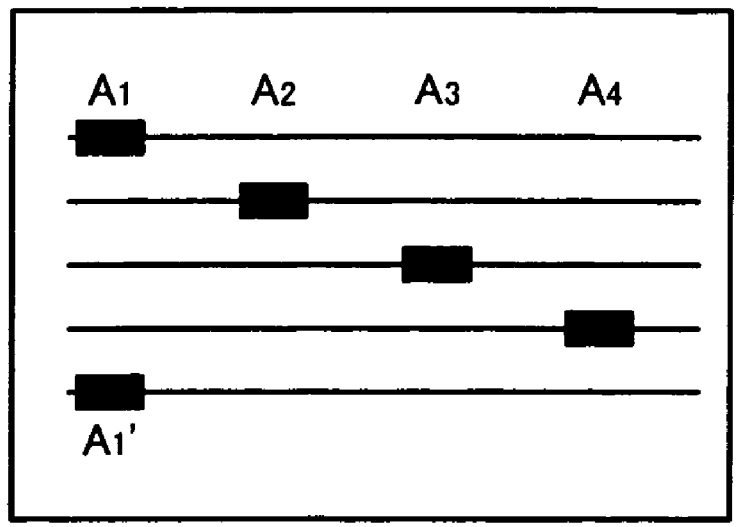
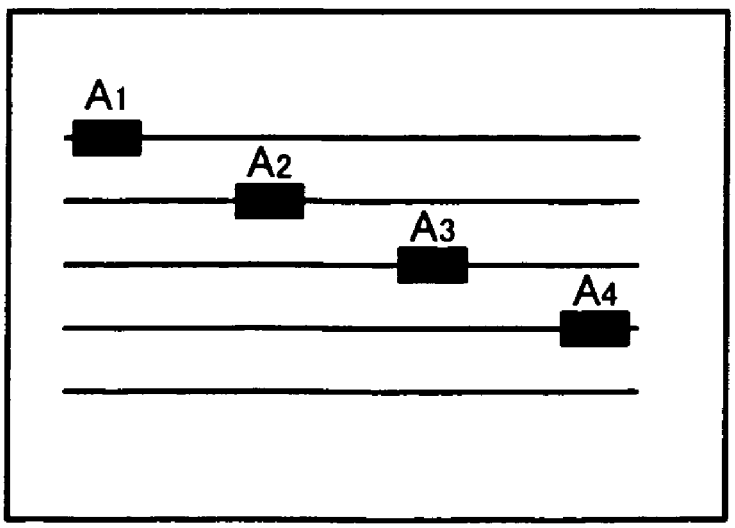

LASER BEAM

| PAYLOAD TYPE | PAYLOAD NUMBER (DECIMAL) | PAYLOAD STATUS (BINARY) |
|---|---|---|
| HEADER (ALWAYS PREPRESSING) | 0 | 00 |
| P-PAYLOAD (PREPRESSING) | 1-63 (INCREMENT) | 00 |
| P-PAYLOAD (PRERECORDING) | | 01 |
| RECORDED R-PAYLOAD | | 10 |
| UNRECORDED R-PAYLOAD | | 11 |

|  | | P | Q | R | S | T | U | V | W |
|---|---|---|---|---|---|---|---|---|---|
| Fig. 16A | 0x47 | 0 | (1) | 0 | 0 | 0 | 1 | 1 | 1 |
|  | 0x07 | 0 | (0) | 0 | 0 | 0 | 1 | 1 | 1 |
| Fig. 16B | 0x40 | 0 | (1) | 0 | 0 | 0 | 0 | 0 | 0 |
|  | 0x00 | 0 | (0) | 0 | 0 | 0 | 0 | 0 | 0 |

RECORDING MEDIUM, RECORDING METHOD, AND RECORDING APPARATUS

TECHNICAL FIELD

The invention relates to a recording medium, a recording method, and a recording apparatus which are applied when data is multiple-written onto the recording medium.

BACKGROUND ART

A method whereby, in the case of recording desired data onto a recording medium, same data is repetitively recorded (multiple-writing) to improve resistance of the data to errors has been known. Owing to the multiple-writing, if there is at least one errorless data among a plurality of data, such errorless data can be used as data without an error. Hitherto, sufficient consideration is not given to a recording position of the data which is multiple-written.

DISCLOSURE OF INVENTION

According to an embodiment of the invention, there is provided a recording apparatus comprising:

detecting means for detecting management data for managing predetermined data from a disc-shaped recording medium on which said management data has previously and repetitively been recorded in the circumferential direction at predetermined intervals;

recording means for recording data onto the recording medium; and recording control means for controlling the recording means so as to repetitively record the predetermined data in the circumferential direction at predetermined intervals on the basis of the management data detected by the detecting means.

According to the invention, a plurality of data to be multiple-written is recorded so as to be distributed as much as possible on the recording medium, so that error resistance to a scratch on the disc, a burst error, or the like is improved.

BRIEF DESCRIPTION OF DRAWINGS

FIG. 3 is a schematic diagram for explaining two examples in the case where the invention is applied to a card-shaped recording medium.

FIG. 16 is a schematic diagram for use in explanation of a recording method of a UDI in the embodiment of the invention.

BEST MODE FOR CARRYING OUT THE INVENTION

Figure 1:
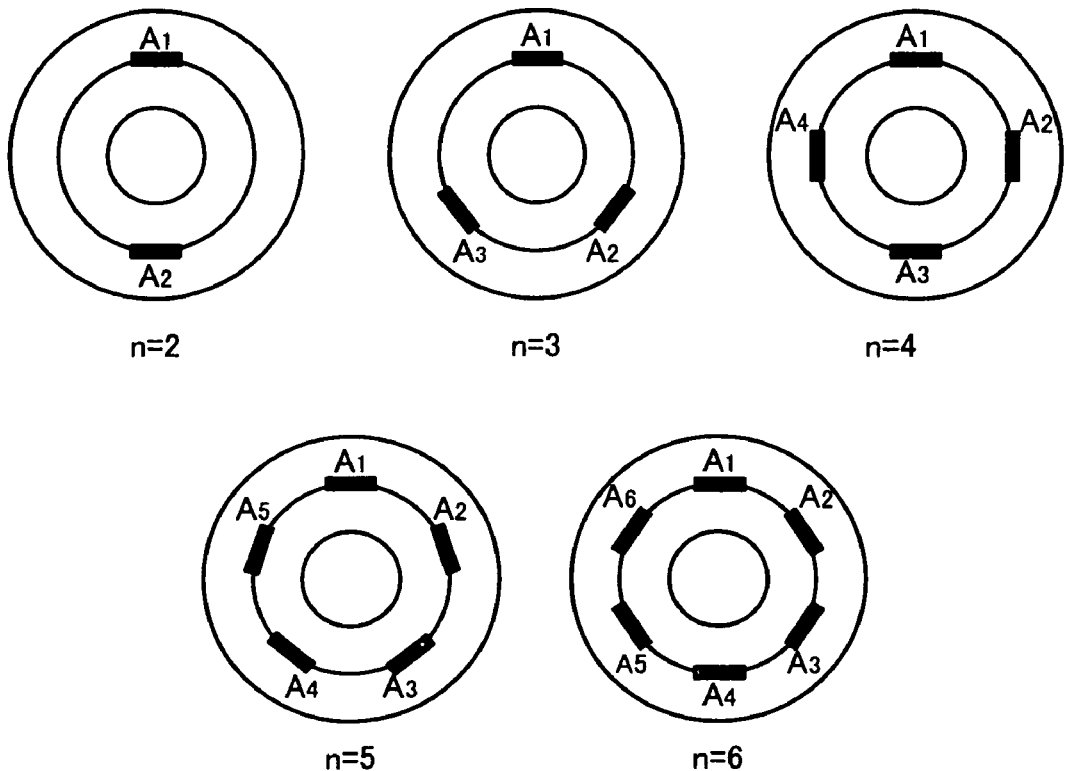
FIG. 1 is a schematic diagram for explaining several examples in the case where the invention is applied to a disc having concentric tracks.
Figure 2:
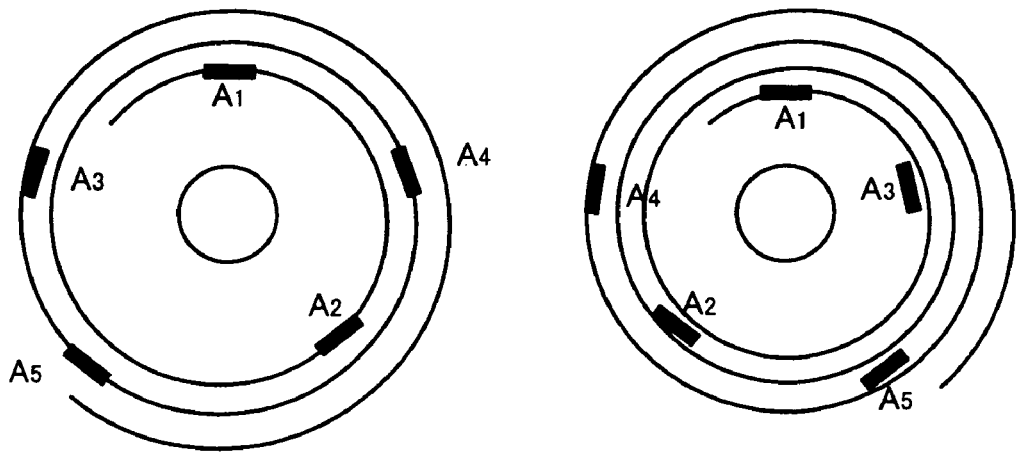
FIG. 2 is a schematic diagram for explaining two examples in the case where the invention is applied to a disc having a spiral track.

The invention will now be described hereinbelow. FIGS. 1 and 2 show several examples in the case where the invention is applied to a disc-shaped recording medium (simply referred to as a disc). FIG. 1 shows the case of multiple-writing predetermined data A to the disc on which tracks have been formed concentrically. Assuming that the number of multiple-writing times is set to n, same data $A_1, A_2, \ldots, A_n$ are recorded onto the disc. Examples of n=2, n=3, n=4, n=5, and n=6 are shown in FIG. 1.

An angle interval $\theta$ of a plurality of data which are multiple-written is selected to be ($\theta=360°/n$). That is, it is selected to be (n=2: $\theta=180°$), (n=3: $\theta=120°$), (n=4: $\theta=90°$), (n=5: $\theta=72°$), and (n=6: $\theta=60°$). It is not necessary that a value of the angle interval $\theta$ coincides accurately with each of those values but it is sufficient that it almost coincides with each of those values.

By selecting the value of the angle interval $\theta$ as mentioned above, a distance between the multiple-written data on the track can be maximized and it is possible to prevent a plurality of data from being arranged in the radial direction. Thus, data reproducing ability against errors due to a scratch, fingerprints, or the like on the disc and a burst error can be improved.

Although the data $A_1$ to $A_n$ have been recorded on the same track in FIG. 1, the data $A_1$ to $A_n$ can be also recorded onto different tracks. When n=5, the angle interval $\theta$ can be selected to be about 144° or about 216° instead of 72°. That is, it is preferable to arrange the data $A_1$ to $A_5$ at the angle intervals of about 72° irrespective of their order.

FIG. 2 shows the examples in which the invention is applied to the case where a track is spirally formed on a disc. The case of n=5 is shown in FIG. 2. In one of the examples, the data $A_1$ to $A_5$ have been sequentially recorded at the angle intervals of about 72°. In the other example, the data $A_1$ to $A_5$ have been sequentially recorded at the angle intervals of about 216°.

The invention is not limited to the disc but can be applied to a rectangular recording medium (card-shaped recording medium). FIG. 3 shows one example and another example of the case of multiple-writing (for example, n=4) in such a case. When a plurality of tracks are formed almost in parallel onto the card-shaped recording medium, the data $A_1$ is recorded onto the nth track, the data $A_2$ is recorded onto the (n+1)th track, the data $A_3$ is recorded onto the (n+2)th track, and the data $A_4$ is recorded onto the (n+3)th track, respectively. Assuming that a length of one track is equal to L, the data is recorded in the track direction at data intervals of about (L/n) (in the example shown in the diagram, L/4). An interval between the data $A_4$ which is recorded last and the first one ($A_1'$) of the data to be subsequently multiple-written is also set to about (L/4).

In another example shown in FIG. 3, the data to be multiple-written is recorded onto the different tracks and multiple-written in the track direction at intervals of about (L/(n−1)) (in the example shown in the diagram, L/3). In this another example, the data which is recorded last is positioned at the edge of the track. Further, although the recording medium has a rectangular shape, the invention can be also applied to a recording medium on which concentric tracks or a spiral track is formed.

An embodiment in which the invention is applied to the case where disc identification information (hereinafter, referred to as UDI) is recorded onto the disc-shaped recording medium will be described hereinbelow. The UDI is recorded so that it can be read out by, for example, an existing CD player or CD-ROM drive. First, a structure of an optical disc, for example, a CD will be described for easy understanding of the embodiment.

Figure 4:
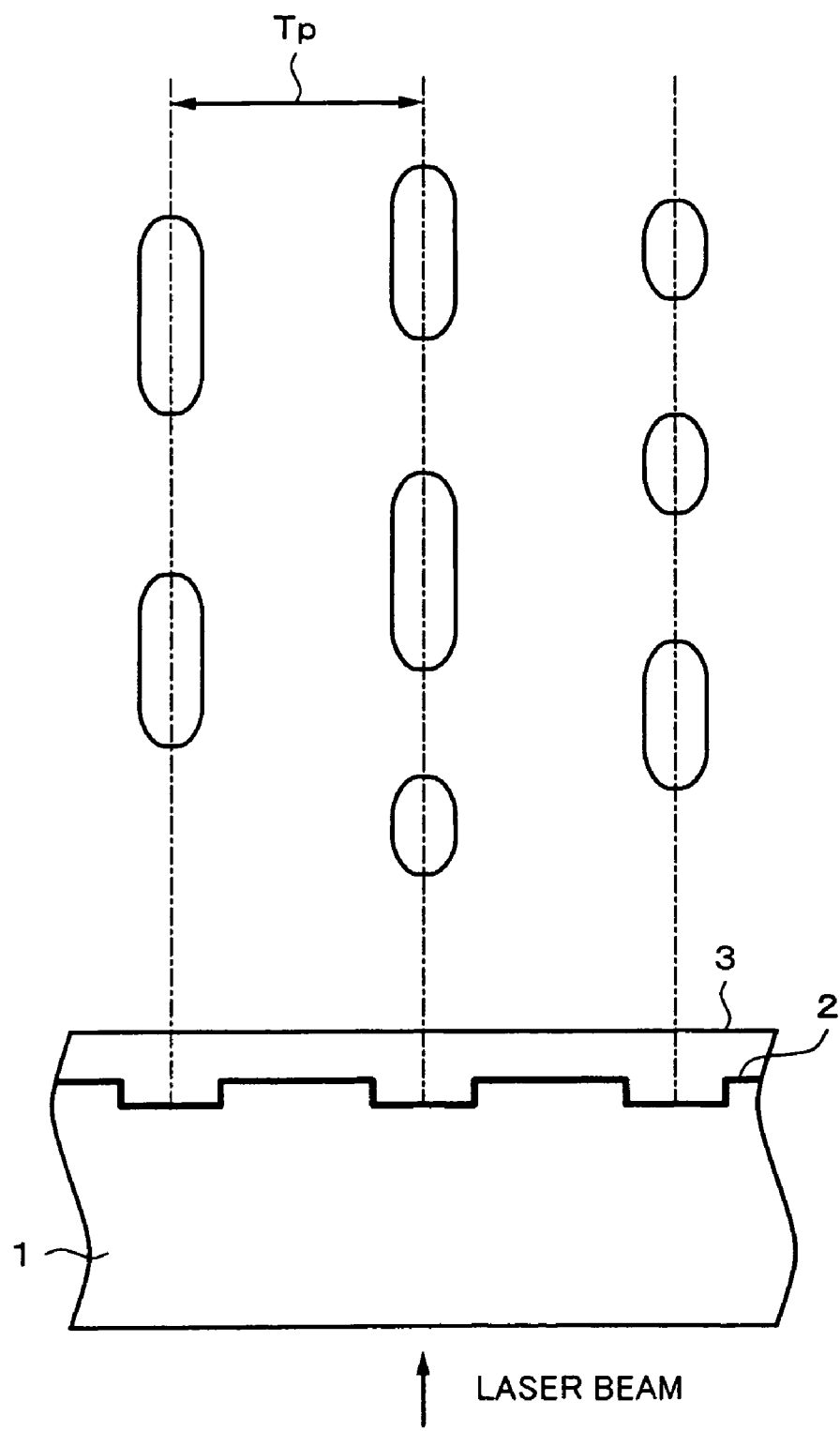
FIG. 4 is a schematic diagram for explaining a recording pattern of a conventional CD and a structure of the CD.

FIG. 4 enlargedly shows a part of the existing CD. Concave portions called pits and lands on which no pit is formed are alternately formed on tracks of a predetermined track pitch Tp (for example, 1.6 μm). Lengths of the pits and the lands lie within a range of 3 T to 11 T. T denotes a shortest inverting interval. A laser beam is irradiated to the CD from the lower side.

The CD has such a structure that a transparent disc substrate 1 having a thickness of 1.2 mm, a reflective film 2 formed thereon, and a protective film 3 formed on the reflective film 2 are sequentially laminated in order from the lower side to which the laser beam is irradiated. A film having high reflectance is used for the reflective film 2. The CD is a read-only disc and, as will be explained hereinafter, after the reflective film 2 is formed, the information (UDI) is recorded to the reflective film 2 by using the laser beam.

A flow of manufacturing steps of the CD as mentioned above will be described with reference to FIG. 5. In step S1, a glass mother disc in which a glass plate is coated with a photoresist as a photosensitive material is rotated by a spindle motor. The laser beam which is turned on/off in accordance with a recording signal is irradiated onto a photoresist film and a master disc is formed. A developing process is executed to the photoresist film. In the case of a positive type resist, photosensed portions are fused and a concave/convex pattern is formed on the photoresist film.

One metal master disc is formed by an electroforming process for plating a photoresist mother disc (step S2). A plurality of mother discs are formed from the metal master disc (step S3). Further, a plurality of stampers are formed from the mother discs (step S4). A disc substrate is formed by using the stamper. A compression molding, an injection molding, a photo-curing method, or the like has been known as a forming method of the disc substrate. The reflective film and the protective film are formed in step S6. According to the conventional disc manufacturing method, the CD is manufactured by further performing label printing.

Figure 5:
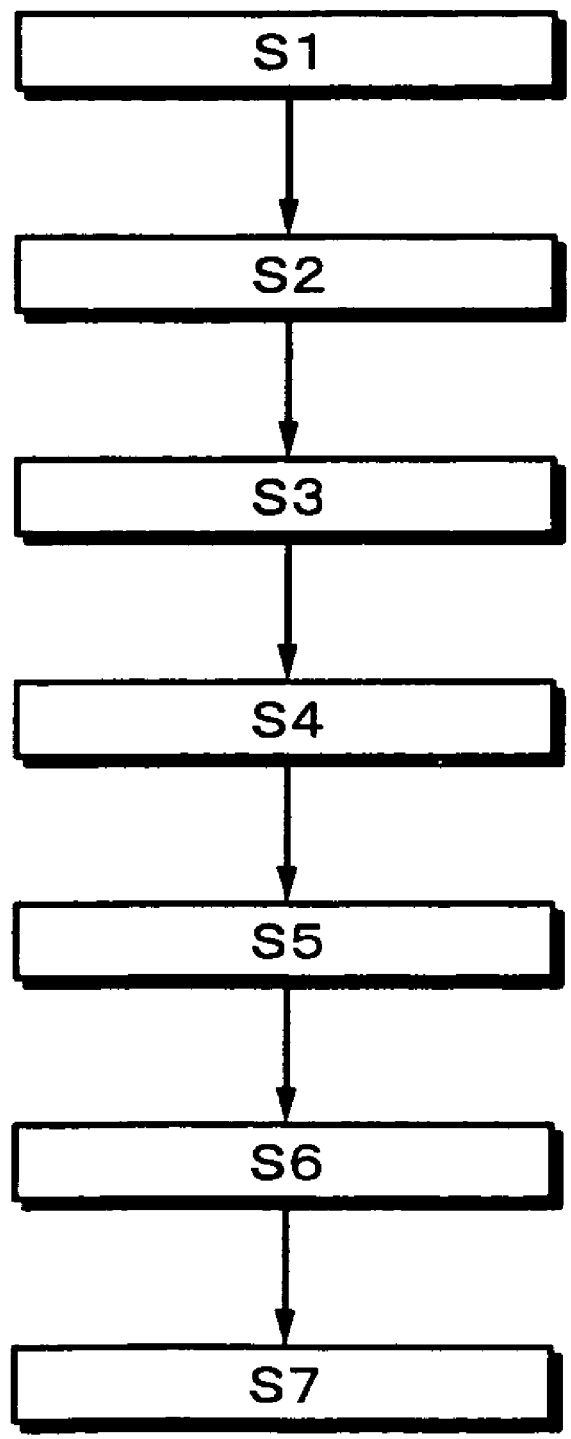
FIG. 5 is a schematic diagram for explaining manufacturing steps of a disc in an embodiment of the invention.

In the example of FIG. 5, step S7 of irradiating the laser beam onto the reflective film and additionally recording information is added. In the land on the reflective film, atoms are moved by a heating process (thermal recording) in which the laser beam is irradiated, a film structure or crystallization changes, and reflectance of this portion decreases. Thus, after the irradiation of the laser beam, even in the land, an amount of return laser beam is small and such a portion is recognized in a similar way to a pit by a reading apparatus. By using such a phenomenon, information can be recorded. In this case, a material whose reflectance is changed by the laser irradiation is used for the reflective film. The reflective film is not limited to the material whose reflectance decreases but a material whose reflectance increases by the recording can be used.

Specifically speaking, the reflective film is constructed by an alloy film $Al_{100-x}X_x$ of aluminum. At least one or more kinds of elements among Ge, Ti, Ni, Si, Tb, Fe, and Ag are used as "X". A composition ratio "x" in the Al alloy film is selected to be a value in a range of 5<x<50 [atom %].

The reflective film can be constructed by an Ag alloy film of $Ag_{100-x}X_x$. In this case, at least one or more kinds of elements among Ge, Ti, Ni, Si, Tb, Fe, and Al are used as "X". A composition ratio "x" in the Al alloy film is selected to be a value in a range of 5<x<50 [atom %]. The reflective film can be made of, for example, a magnetron sputtering method.

For example, in the case where a reflective film made of an AlGe alloy is formed so as to have a film thickness of 50 nm and the laser beam is irradiated from the transparent substrate or the protective film side through an objective lens, when a composition ratio of Ge is equal to 20 [atom %] and a recording power is equal to 6 to 7 [mW], the reflectance deteriorates by about 6%. When the composition ratio of Ge is equal to 27.6 [atom %] and the recording power is equal to 5 to 8 [mW], the reflectance deteriorates by about 7 to 8%. Such a change in reflectance enables the additional recording to the reflective film.

Figure 6:
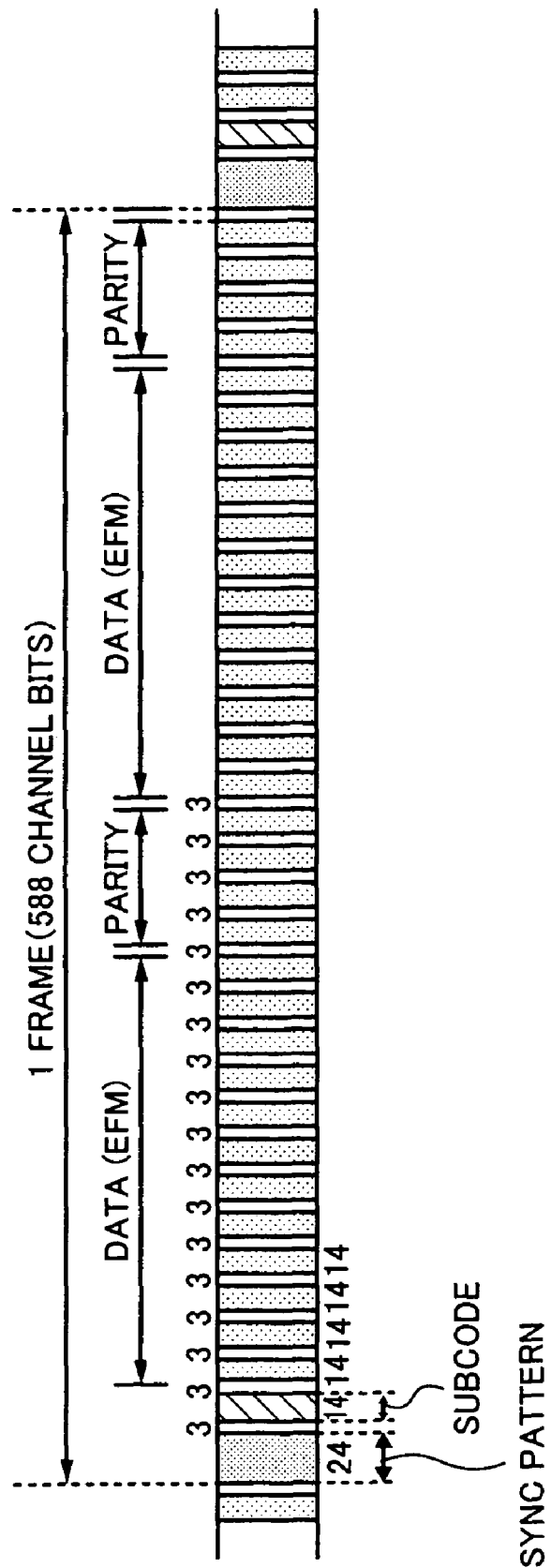
FIG. 6 is a schematic diagram for explaining a frame format of the CD.

Further, FIG. 6 shows a data construction of one frame of the signal for the conventional CD. In the CD, a parity Q and a parity P each consisting of 4 symbols are formed by a total of 12 samples (24 symbols) of digital audio data of two channels. 33 symbols (264 data bits) obtained by adding one symbol of a subcode to those total of 32 symbols are handled as one group. That is, 33 symbols comprising the subcode of 1 symbol, data of 24 symbols, the Q parity of 4 symbols, and the P parity of 4 symbols are included in one frame obtained after the EFM modulation.

In an EFM modulation system (eight to fourteen modulation: EFM), each symbol (8 data bits) is converted into 14 channel bits. A minimum time width (a time width in which the number of 0 between 1 and 1 of a recording signal becomes the minimum) Tmin of the EFM modulation is equal to 3 T. A pit length corresponding to 3 T is equal to 0.87 μm. A pit length corresponding to T is the shortest pit length. Coupling bits of 3 bits are arranged between the 14 channel bits and the 14 channel bits. Further, a frame sync pattern is added to the head of the frame. Assuming that a period of the channel bits is equal to T, the frame sync pattern is set to a pattern in which 11 T, 11 T, and 2 T continue. Since such a pattern does not occur in an EFM modulation rule, this peculiar pattern enables the frame sync to be detected. The total number of bits of one frame is equal to 588 channel bits. A frame frequency is set to 7.35 kHz.

A frame group comprising 98 frames as mentioned above is called a subcode frame (or a subcode block). The subcode frame expressed by rearranging those 98 frames so as to be continuous in the vertical direction comprises: a frame sync portion to identify the head of the subcode frame; a subcode portion; data; and a parity portion. The subcode frame corresponds to 1/75 second of a reproducing time of the ordinary CD.

The subcode portion is constructed by 98 frames. Each of two head frames in the subcode portion is a sync pattern of the subcode frame and is a pattern of an (out of rule) of the EFM. The bits in the subcode portion construct the P, Q, R, S, T, U, V, and W channels, respectively.

The R to W channels are used for a special application such as still image, character display of what is called KARAOKE, or the like. The P and Q channels are used for the track position control operation of a pickup upon reproduction of digital data recorded on the disc.

The P channel is used to record a signal of "0" in what is called a lead-in area locating in a disc inner rim portion and to record a signal in which "0" and "1" are repeated at a predetermined period in what is called a lead-out area locating in a disc outer rim portion. In a program area locating between the lead-in area and the lead-out area of the disc, the P channel is used to record a signal in which an interval between music pieces is set to "1" and the other portions are set to "0". Such a P channel is provided to search for a head of each music piece upon reproduction of digital audio data recorded on the CD.

Figure 7:
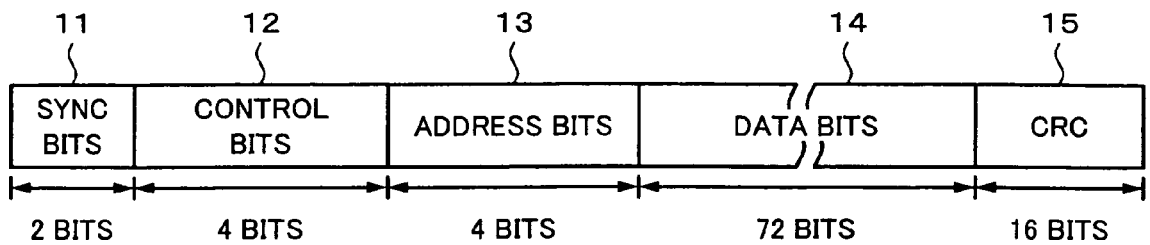
FIG. 7 is a schematic diagram for explaining a subcode frame of a subcode in a Q channel.

The Q channel is provided to enable finer control upon reproduction of the digital audio data recorded on the CD. As shown in FIG. 7, a structure of one subcode frame in the Q channel comprises: a sync bit portion 11; a control bit portion 12; an address bit portion 13; a data bit portion 14; and a CRC bit portion 15.

The sync bit portion 11 consists of data of 2 bits and a part of the foregoing sync pattern has been recorded there. The control bit portion 12 consists of data of 4 bits and data such as the number of audio channels, emphasis, digital data, and the like has been recorded there. When the data of 4 bits is equal to "0000", it indicates the audio signal of two channels without a preemphasis. When it is equal to "1000", it indicates the audio signal of four channels without a preemphasis. When it is equal to "0001", it indicates the audio signal of two channels with the preemphasis. When it is equal to "1001", it indicates the audio signal of four channels with the preemphasis. When the data of 4 bits is equal to "0100", it indicates the non-audio data track. The address bit portion 13 consists of data of 4 bits and a control signal showing a format (mode) and a type of data in the data bit portion 14, which will be explained hereinafter, has been recorded there. The CRC portion 15 consists of data of 16 bits and data for performing error detection of a cyclic code (Cyclic Redundancy Check code: CRC) has been recorded there.

Figure 8:
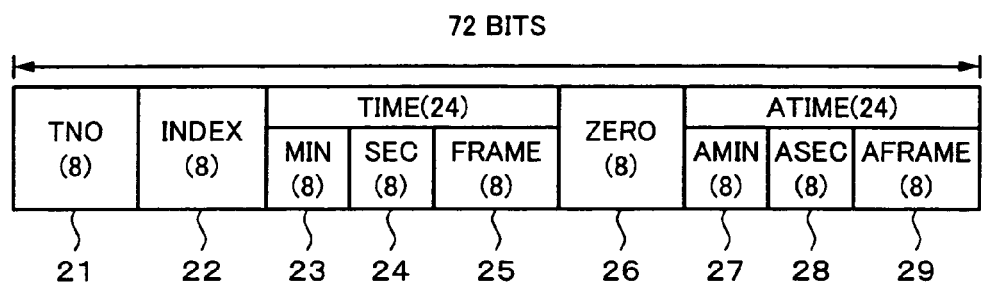
FIG. 8 is a schematic diagram showing a format of Mode 1 to record time information as a subcode in the Q channel.

The data bit portion 14 consists of data of 72 bits. When the data of 4 bits in the address bit portion 13 is equal to "0001" (that is, Mode 1), the data bit portion 14 has a construction in which a time code (position information) as shown in FIG. 8 is recorded. That is, the data bit portion 14 is constructed by: a track number portion (TNO) 21; an index portion (INDEX) 22; an elapsed time portion (comprising a minute component portion (MIN) 23, a second component portion (SEC) 24, and a frame number portion (FRAME) 25); a zero portion (ZERO) 26; and an absolute time portion (comprising a minute component portion (AMIN) 27, a second component portion (ASEC) 28, and a frame number portion (AFRAME) 29). Each of those portions consists of data of 8 bits.

The track number portion (TNO) 21 is expressed by a binary coded decimal notation (Binary Coded Decimal: BCD) of 2 digits. The track number portion (TNO) 21 shows the number of the lead-in track as a track where the reading operation of the data is started at "00". Each of "01" to "99" indicates the track number corresponding to the number of each music piece, movement, or the like. The track number portion (TNO) 21 also shows the number of the lead-out track as a track in which the reading operation of the data is finished at "AA" of the hexadecimal notation.

The index portion (INDEX) 22 is expressed by the BCD of two digits. "00" indicates a temporary stop, what is called "pause", and each of "01" to "99" indicates a track portion obtained by further finely dividing the track of each music piece, movement, or the like.

Each of the minute component portion (MIN) 23, the second component portion (SEC) 24, and the frame number portion (FRAME) 25 is expressed by the BCD of two digits. The elapsed time (TIME) in each music piece or movement is shown by six digits in total. In the zero portion (ZERO) 26, "0" is added to all of 8 bits.

Each of the minute component portion (AMIN) 27, the second component portion (ASEC) 28, and the frame number portion (AFRAME) 29 is expressed by the BCD of two digits. The absolute time (ATIME) from the first music piece is shown by six digits in total.

Figure 9:
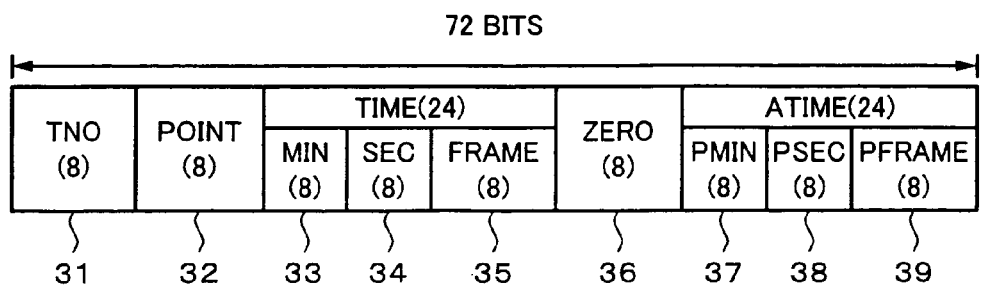
FIG. 9 is a schematic diagram for explaining a format of a subcode in a TOC area.

As shown in FIG. 9, a structure of the data bit portion 24 in a TOC (Table of Contents) in the lead-in area of the disc is constructed by: a track number portion (TNO) 31; a point portion (POINT) 32; an elapsed time portion (comprising a minute component portion (MIN) 33, a second component portion (SEC) 34, and a frame number portion (FRAME) 35); a zero portion (ZERO) 36; and an absolute time portion (comprising a minute component portion (PMIN) 37, a second component portion (PSEC) 38, and a frame number portion (PFRAME) 39). Each of those portions consists of data of 8 bits.

Each of the track number portion (TNO) 31 and the minute component portion (MIN) 33, the second component portion (SEC) 34, and the frame number portion (FRAME) 35 in the elapsed time portion is fixed to "00" by the hexadecimal notation. In the zero portion (ZERO) 36, "00" is added to all of 8 bits in a manner similar to the zero portion (ZERO) 26 mentioned above.

In the absolute time minute component portion (PMIN) 37, when the point portion (POINT) 32 is equal to "A0" by the hexadecimal notation, it indicates the number of the first music piece or movement. When the point portion (POINT) 32 is equal to "A1" by the hexadecimal notation, it indicates the number of the first music piece or movement. When the point portion (POINT) 32 is equal to "A2" by the hexadecimal notation, each of the absolute time minute component portion (PMIN) 37, the absolute time second component portion (PSEC) 38, and the absolute time frame number portion (PFRAME) 39 indicates the absolute time (PTIME) at which the lead-out area starts. Further, when the point portion (POINT) 32 is expressed by the BCD of 2 digits, in each of the absolute time minute component portion (PMIN) 37, the second component portion (PSEC) 38, and the frame number portion (PFRAME) 39, an address in which each music piece or movement shown by its numerical value starts is shown by the absolute time (PTIME).

As mentioned above, in the Q channel, although the format in the program area of the disc and that in the lead-in area slightly differ, the time information shown by 24 bits is recorded in both of those areas. In the subcode of the Q channel of Mode 1 shown in FIG. 8, such a condition that 9 or more subcode frames are included in any 10 continuous subcode frames on the disc has been predetermined on the standard of the CD. As mentioned above, the subcode frame corresponds to 98 continuous frames which construct one delimiter of the subcode in which the two head frames are set to the sync pattern.

In the case of the subcode in the modes of Mode 2 to Mode 5 other than Mode 1, it is specified that it is sufficient that one or more frames exist in 100 continuous subcode frames. Mode 2 and Mode 3 are used for recording a UPC/EAN (Universal Product Code/European Article Number) code and an ISRC (International Standard Recording Code) code. Mode 4 is used for a CDV. Mode 5 is used for the lead-in area of a CD-EXTRA of multisession. Therefore, the above explanation about Modes 1 to 3 is actually sufficient in consideration of the subcodes in the Q channels of Mode 1, Mode 2, and Mode 3 and an explanation about Mode 4 and Mode 5 is omitted hereinbelow.

As mentioned above, in the embodiment of the invention, by irradiating the laser beam to the reflective film, the change in reflectance is caused and the UDI is recorded. The UDI comprises stamper-unique first data and disc-unique second data and is information for identifying each disc. For example, the first data includes a name of a disc manufacturer, a name of a disc seller, a name of a manufacturing factory, a manufacturing year, and the like. For example, the second data includes a serial number, time information, and the like. In the embodiment, the UDI is recorded in a data format of the Q channel of the subcode. Therefore, the UDI can be regarded as a new mode of the Q channel of the subcode. Mode 7 is defined here as a mode of the Q channel for recording the UDI.

In the case where the UDI is constructed by the first and second data as mentioned above, if all data of the UDI is recorded by the recording method for the reflective film, a data amount of the UDI cannot be increased because it is necessary to record within a limited time. In the embodiment, therefore, the stamper-unique first data is recorded as a concave/convex pattern and the disc-unique second data is recorded by using the recording method for the reflective film. Further, in the embodiment, after the manufacturing, arbitrary data (third data) can be recorded onto the disc by the recording method for the reflective film. The actual recording operation is executed in a record shop, a rental shop, or the like equipped with a dedicated recording apparatus. The arbitrary data includes a code of a shop name, the number of rental times, a user ID, and the like.

In the following description, the method of recording the concave/convex pattern by the mastering step is called "prepressing" and the additional recording method for the reflective film is called "prerecording". A main body portion of the UDI data is called "payload". The payload which is prepressed and the payload which is prerecorded are generally called "P-payload". A main body portion of the third data which is recorded later is called "R (Recordable)-payload". Further, a payload as a header is called "payload 0".

Figure 10A:
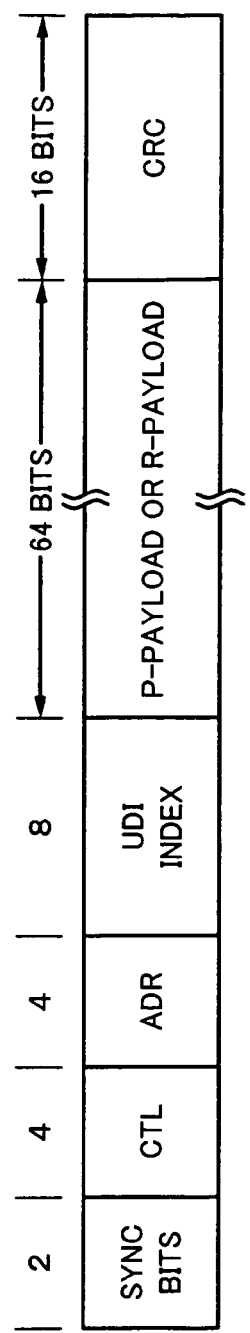
FIG. 10A is a schematic diagram showing a data format of a UDI constructed by a subcode frame consisting of 98 frames.

FIG. 10A shows a data format of the UDI constructed by the subcode frame consisting of 98 frames. Since the UDI is recorded in the format of the Q channel of the subcode, one frame (98 bits) of the subcode is constructed by: a sync bit portion of 2 bits; a control bit portion (CTL) of 4 bits; an address bit portion (ADR) of 4 bits; a data bit portion of 72 bits; and a CRC of 16 bits. 4 bits of the address bit portion are set to a value showing Mode 7.

Figure 10B:
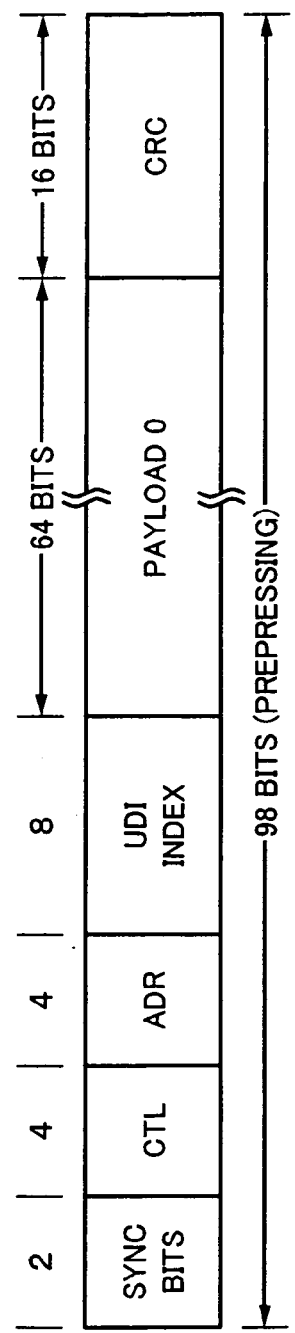
FIG. 10B is a schematic diagram showing a data format of a payload 0 as a header.

In a data area of 72 bits, the head 8 bits indicate a UDI index and the residual 64 bits correspond to the data main body (payload) of the UDI. The data format shown in FIG. 10A is common to both of the P-payload and the R-payload. FIG. 10B shows a data format of payload 0 as a header. The subcode frame including payload 0 has been recorded by prepressing.

Figures 11A, 11B:
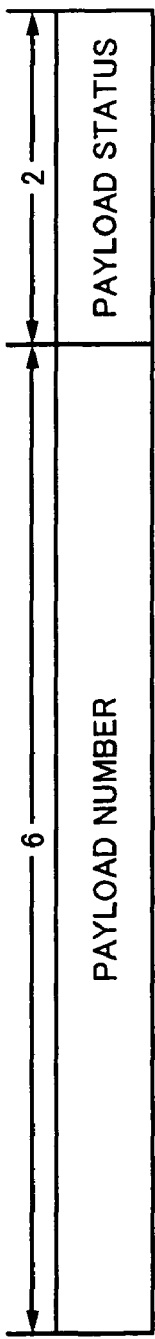
FIG. 11A is a schematic diagram showing a UDI index comprising a payload number (6 bits) indicative of the number of the payload and a payload status (2 bits).
FIG. 11B is a diagram showing definition of the payload number and the payload status.

As shown in FIG. 11A, the UDI index comprises: a payload number (6 bits) showing the number of the payload; and a payload status (2 bits). The payload number is a value which is incremented from 1. For example, the minimum number of payloads is set to 1 and the maximum number of payloads is set to 63. In the case of payload 0, the payload number is set to 0. The payload number and the payload status have been defined as shown in FIG. 11B. The definition of the payload status is shown below.

00: Header and prepressed P-payload
01: Prerecorded P-payload
10: Recorded R-payload (has already been recorded)
11: Unrecorded R-payload That is, the payload status of 2 bits is an identifier for the subsequent payload.

The UDI is recorded in, for example, a UDI area provided in the program area on the disc. An area of the prepressing payload, an area of the prerecording payload, and an area of the recordable payload are provided in order in the UDI area. Payload 0 is recorded as a UDI header in the head of the UDI area.

Figures 12A, 12B:
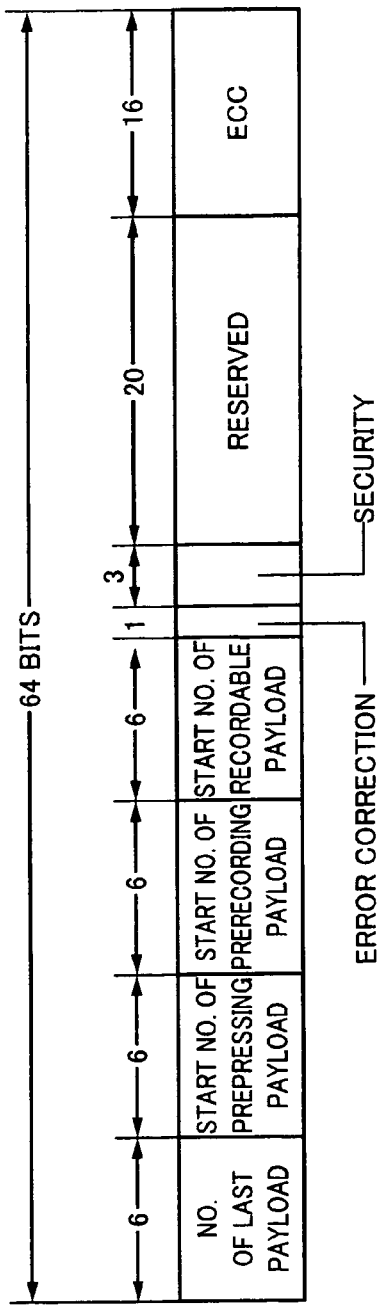
FIG. 12A is a schematic diagram showing a data format of a payload 0.
FIG. 12B is a diagram showing a value in each field of the payload 0.

FIG. 12A shows the data format of payload 0. The subcode frame including payload 0 has been recorded by prepressing. A last payload number (6 bits), a prepressing payload start number (6 bits), a prerecording payload start number (6 bits), a recordable payload start number (6 bits), an error correction (1 bit), a security (3 bits), and an ECC (16 bits) are included in payload 0. The residual 20 bits are not defined and can be defined in the future. The payload number of payload 0 is set to 0.

FIG. 12B shows a value of each field of payload 0. A value of the last payload number can be set to a value within a range from 1 to 63. Each of the prepressing payload start number, the prerecording payload start number, and the recordable payload start number can be set to a value within a range from 0 to 63. When such a value is equal to 0, it means that no payload exists.

When the error correction (1 bit) is equal to a value "0", it means that the ECC is not performed. When it is equal to a value "1", it means that the ECC has been performed. When a value of the security is equal to (000), this means that it denotes "non-secure". When it is equal to (100), this means that it denotes "secure". Other values are not defined yet. The ECC is set to either an ECC parity (the case of the error correction="1") or zero data (the case of the error correction="0").

Figure 13A:
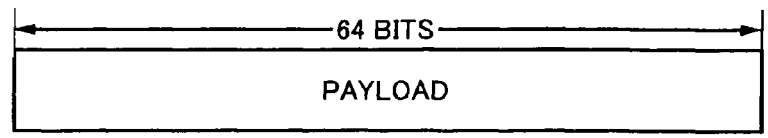
FIG. 13A is a schematic diagram showing a data format of a P-payload in the case where there is no ECC.
Figure 13B:
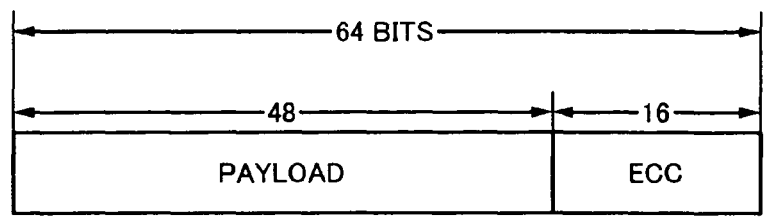
FIG. 13B is a schematic diagram showing a data format of the P-payload in the case where there is an ECC.

FIGS. 13A and 13B show data formats of the P-payload. The data format in the case where there is no ECC is shown in FIG. 13A. The data format in the case where the ECC exists is shown in FIG. 13B.

Figure 14A:
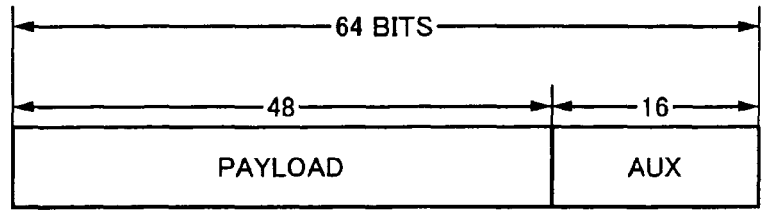
FIG. 14A is a schematic diagram showing a data format of an R-payload in the case where there is no ECC.
Figure 14B:
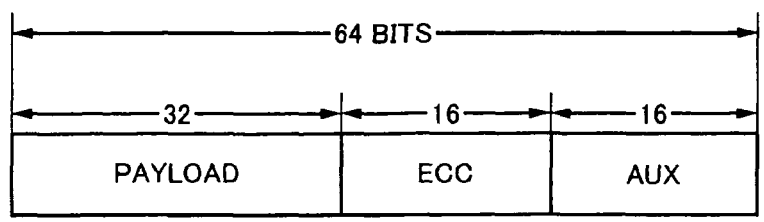
FIG. 14B is a schematic diagram showing a data format of the R-payload in the case where there is an ECC.

FIGS. 14A and 14B show data formats of the R-payload. The data format in the case where there is no ECC is shown in FIG. 14A. The data format in the case where the ECC exists is shown in FIG. 14B. At a stage where the data has been formed by mastering, a payload field, an ECC field (in the case where the ECC is applied), and a CRC field are set to "1", respectively. An initial value of the CRC of 16 bits is set to 0. The CRC of 16 bits is calculated from the data (control CTL, address ADR, UDI index, and payload) shown in FIG. 10A and a calculation result is inserted as AUX. When recording is executed, a CRC is calculated in accordance with data to be recorded and a calculation result is recorded into the CRC. Such a process is executed to enable the correct result of the CRC detection to be obtained if there is no error at both timing before and after the recording to the R-payload.

Figure 15:
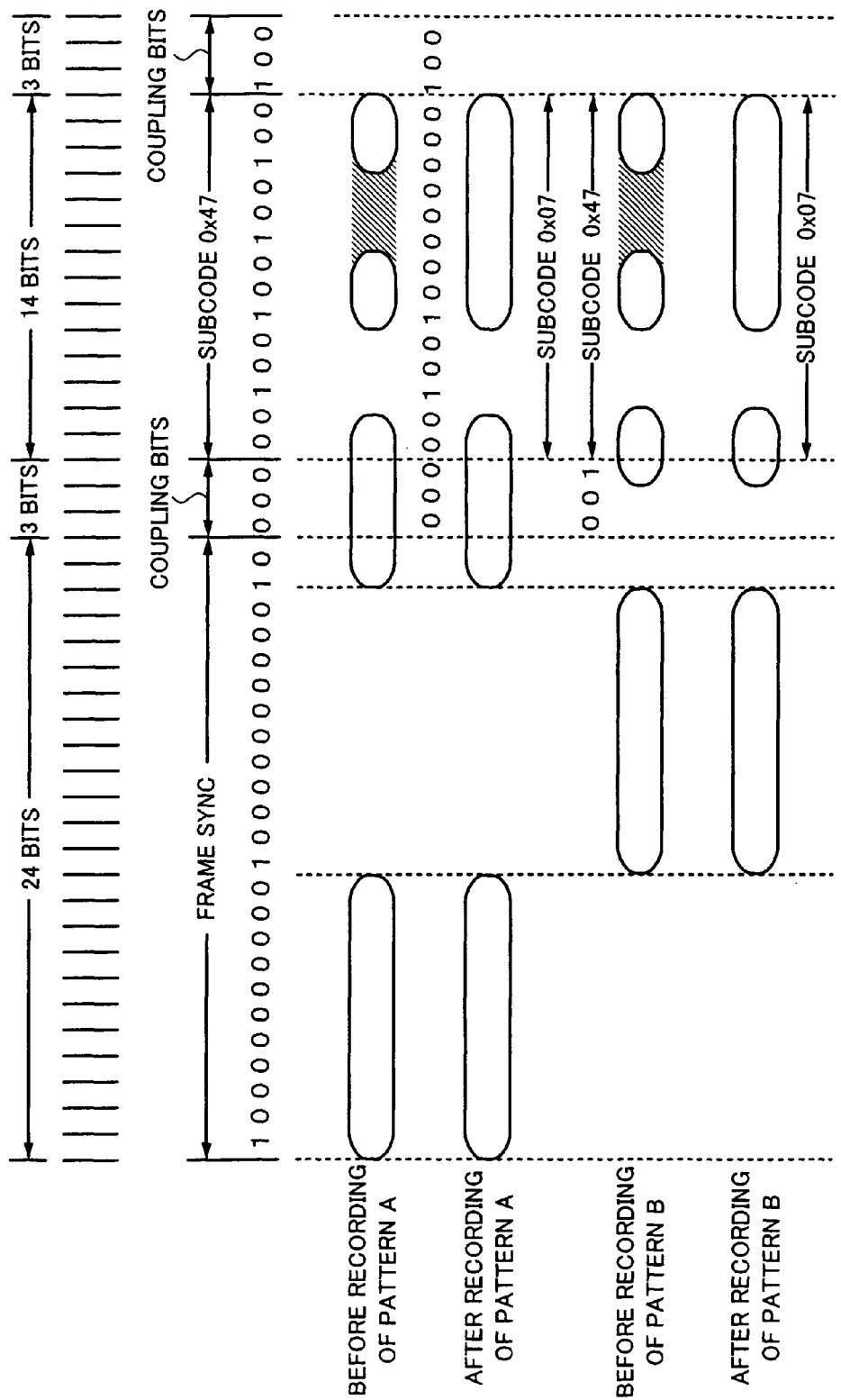
FIG. 15 is a schematic diagram for use in explanation of a recording method of a UDI in the embodiment of the invention.

FIG. 15 is a diagram for more schematically explaining the additional recording method of the UDI. A frame sync is set to a length of 24 bits (channel bits), an inverting interval is set to 11 T and 11 T, and 2 T is added after that. A pattern can be set to either a pattern A or a pattern B in dependence on a corresponding method of two 11T, the pit, and the land. First, the pattern A will be described.

Coupling bits (000) of 3 bits are inserted between the symbols of the frame sync and the subcode. In the case of recording the UDI, the subcode symbol on the optical disc molded by stamping is set to (0x47). "0x" denotes the hexadecimal notation. A pattern (00100100100100) of 14 bits as a result obtained by EFM modulating those 8 bits is shown in FIG. 15.

The laser beam for additional recording is irradiated into a hatched region between two pits. Thus, reflectance in the hatched region deteriorates. After the recording, those two pits are reproduced as one coupled pit. A pattern of 14 bits in this case becomes (00100100000000). If it is EFM demodulated, it is demodulated as 8 bits of (0x07).

In the case of the pattern B in which 11 T on the front side is the land and 11 T on the rear side is the pit, coupling bits are (001). Also in this case, by irradiating the laser beam into a hatched region, 8 bits of the subcode can be changed from (0x47) to (0x07) in a manner similar to the pattern A.

As shown in FIG. 16A, in 96 frames other than the head 2 frames which are used as frames of the sync signal among 98 frames, 8 bits of the subcode correspond to the bits of the channels P, Q, R. S, T, U, V, and W, respectively. Therefore, as will be obviously understood from FIG. 16A, the operation to change 0x47 to 0x07 is equivalent to such an operation that only the bits in the channel Q are changed to "1" or "0" without changing the bits in the channels other than the channel Q. Therefore, all bits of the data which is prerecorded are equal to "1" before recording and only the portions where the laser beam has been irradiated are set to "0".

FIG. 16B shows another example of the additional recording method. It relates to the example in which when the bit of the UDI is equal to "0", 8 bits of the subcode are changed from (0x40) to (0x00). Also in such another example, only the bits in the channel Q can be changed to "1" or "0" without changing the bits in the channels other than the channel Q.

Further, in the examples of FIGS. 16A and 16B, the channel P is set to the value of "0". The channel P is set to "1" in the case of an interval between music pieces and to "0" in the case of an inside of music piece data. Since the interval between the music pieces is short to be about 2 to 3 seconds, there is a case where if a reproducing apparatus determined that a reproducing portion corresponds to the interval between the music pieces, the reproducing apparatus does not read out the subcode recorded in such an interval. Therefore, the interval between the music pieces is improper as a location where the UDI is recorded. As mentioned above, by setting P="0", the UDI can be recorded into the portion of the music piece.

The UDI area where the UDI has been recorded is formed at the fixed position on the disc. As an additional recording method for the reflective film, in the case of using a method of recording by rotating the disc at a one-time speed, if the UDI is recorded into the whole program area of the disc, a time that is required for recording becomes long. Therefore, for example, the UDI area is provided for the head portion of the program area and the UDI is recorded there.

According to the standard of the CD, the ratio has been specified with respect to the Q channel of the subcode That is, as mentioned above, in the subcode of Mode 1, it is necessary that 9 or more subcode frames are included in any 10 continuous subcode frames on the disc. It has also been specified that in the case of the subcodes of Mode 2 and Mode 3 other than Mode 1, it is sufficient that one or more subcode frames exist in 100 continuous subcode frames.

Figure 17:
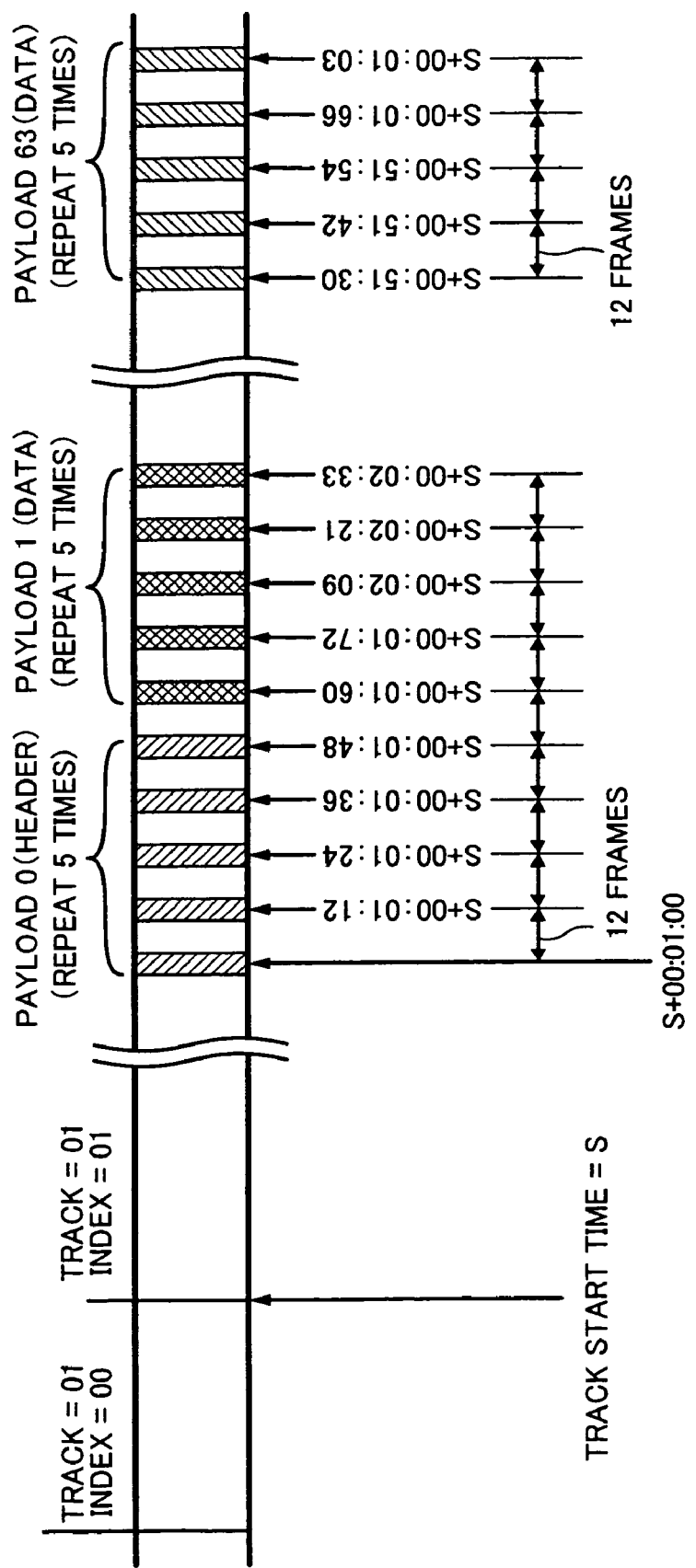
FIG. 17 is a schematic diagram for use in explanation of an example of a layout in a UDI area.

A recording method which can record the UDI to the fixed position while satisfying such a standard of the ratio will now be described. FIG. 17 shows an example of a recording layout of the UDI. The UDI is set to a subcode of Mode 7. Payload 0 is recorded in the head of the UDI area. In the case of recording payload 0 and other payloads, they are multiple-written for the purpose of taking a countermeasure against errors. In the example of FIG. 17, quintuple-recording is performed. Payload 1 is recorded after payload 0. In the case of performing the quintuple-recording, the payloads of the same payload number are collectively quintuple-recorded.

In the CD or the like, after the program area starts and a silent portion (interval between the music pieces) shown by the track=01 and the index=00exists for about two seconds, the first music piece is started from track start time S. The UDI is recorded from the position after one second from the track start time S. The payloads are arranged in positions (S+00 (minute):01 (second):00 (frame), S+00:01:12, . . . ) of intervals of 12 frames (which denote the subcode frames). The subcode of Mode 1 can be recorded in the position where no UDI is recorded. The first subcode frame of payload 1 is recorded in the position of (S+00:01:60). Areas of 9 subcode frames before the recording position of the first payload and 9 subcode frames after the last payload are areas where the subcodes of Mode 1 are recorded. Since importance of Mode 1 is higher than those of other Mode 2 and Mode 3, it must not infringe the standard of the ratio regarding Mode 1. However, it is not always necessary to satisfy the standard of the ratio regarding Mode 2 or Mode 3 according to circumstances. For example, the recordable area of Mode 2 or Mode 3 can be omitted.

The numerical values of the subcode frames in the recording layout shown in FIG. 17 are shown as an example and other various numerical values can be used. However, the interval for arranging the data of the payloads to be multiple-written is set so that a plurality of data (5 data here) to be multiple-written is widely distributed on the track because they are not arranged in the radial direction of the disc as described with reference to FIG. 1 or 2. The foregoing interval of 12 frames satisfies such a condition.

A length of circumference (one circumference of the track) is determined in accordance with the position on the disc where the UDI is recorded. For example, when the recording position is set to a position corresponding to a diameter of about 50 to 51 mm, one circumference is equal to about 157.1 to 160.2 mm. One subcode frame (1 sector) is equal to 1/75 (sec). In the CD, since a linear velocity is constant to be, for example, 1.2 (m/sec), a displacement of a period of 1/75 (sec) is equal to 16 mm. Therefore, the intervals corresponding to 10 frames, 11 frames, 12 frames, and 13 frames are equal to 160 mm, 176 mm, 192 mm, and 208 mm, respectively.

Among those values, 160 mm in the case of 10 frames is equal to the length of almost one circumference. If the interval is set to 10 frames, five payloads to be multiple-written are arranged in the diameter direction of the disc, so that the error resistance becomes weak. In the case of the quintuple-writing, a value (192 mm) which is 1.2 times as large as 160 mm is preferable because the data interval is widened. The value in the case of the interval of 12 frames mentioned above is equal to 192 mm. In the embodiment, therefore, the interval of the data which is quintuple-written is set to 12 frames.

If the recording position of the UDI, the number (n) of multiple-writing times, or the linear velocity differs, the numerical value of the data interval is set to a value other than 12 frames. Even if the linear velocity is equal to 1.15 (m/sec) and slightly deviated from the standard, the data can be reproduced by the existing CD player or CD-ROM drive. In the case of such a linear velocity, it is also possible that only one of the intervals among the five data to be quintuple-written is set to a value larger than 12 frames. That is, the intervals are not limited to the equal intervals.

Figure 18:
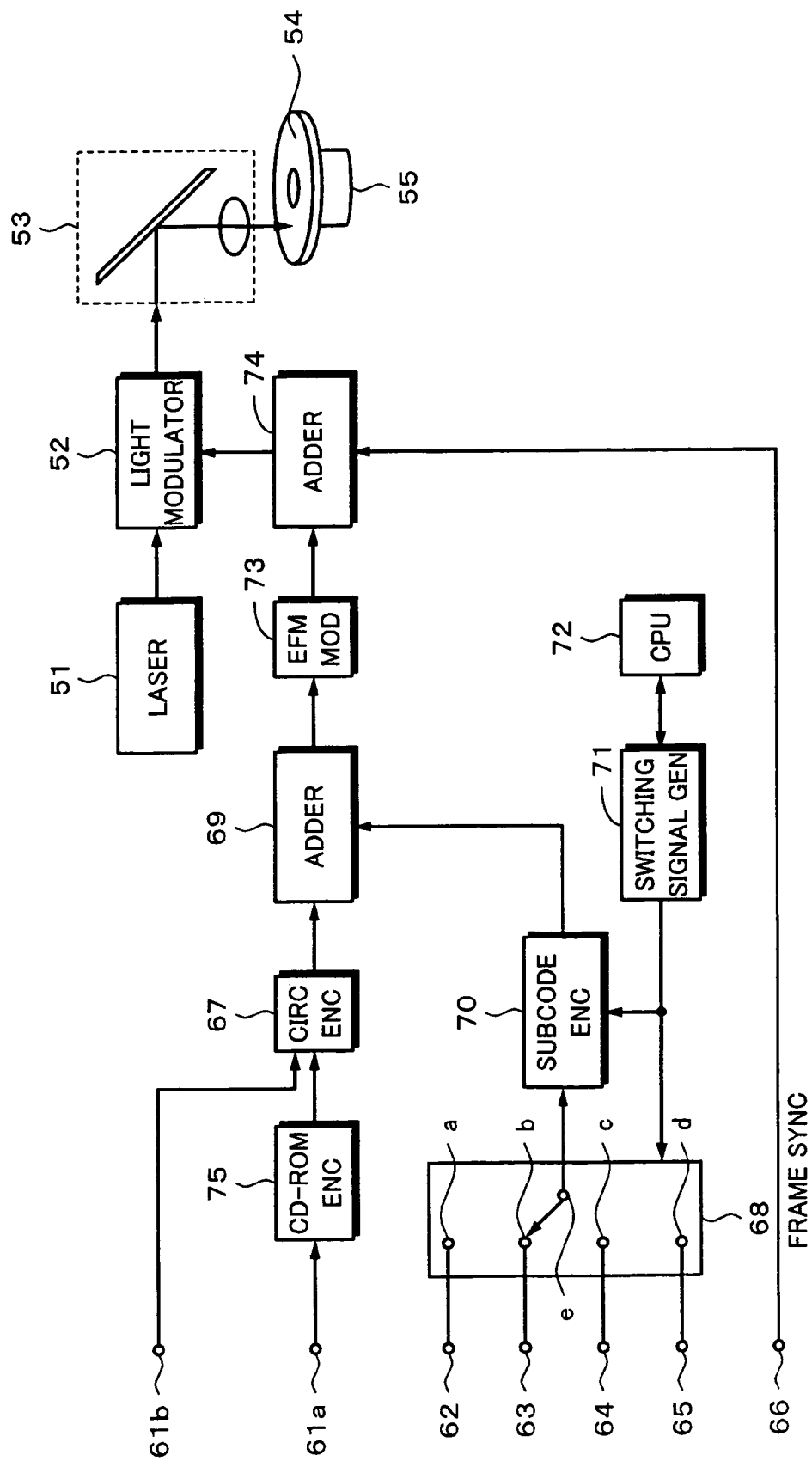
FIG. 18 is a block diagram showing an example of a construction of a mastering apparatus according to an embodiment of the invention.

FIG. 18 shows an example of a construction of a mastering apparatus for forming the data recording medium according to the invention. The mastering apparatus has: a laser 51 as a gas laser such as Ar ion laser, He—Cd laser, Kr ion laser, or the like or a semiconductor laser; a light modulator 52 of an acousto-optical effect type or an electro-optical type for modulating a laser beam emitted from the laser 51; and an optical pickup 53 as recording means having an objective lens or the like for converging the laser beam which passed through the light modulator 52 and irradiating it onto a photoresist surface of a disc-shaped glass mother disc 54 coated with a photoresist as a photosensitive material.

The light modulator 52 modulates the laser beam from the laser 51 in accordance with the recording signal. By irradiating the modulated laser beam onto the glass mother disc 54, the mastering apparatus forms a master on which the data has been recorded. A servo circuit (not shown) for controlling so as to keep a distance between the optical pickup 53 and the glass mother disc 54 constant, controlling tracking, and controlling the rotation driving operation of a spindle motor 55 is provided. The glass mother disc 54 is rotated by the spindle motor 55.

The recording signal from an adder 74 is supplied to the light modulator 52. Main digital data to be recorded is supplied from input terminals 61a and 61b. The data from the input terminal 61a is converted into data in a format of the CD-ROM by a CD-ROM encoder 75 and supplied to a CIRC (Cross Interleave Reed-Solomon Code) encoder 67. The data which is inputted to the input terminal 61b has the CD-ROM format and is supplied to the CIRC encoder 67 without passing through the CD-ROM encoder 67.

The CIRC encoder 67 executes an error correction encoding process for adding parity data or the like for error correction or a scrambling process. That is, the error correction encoding process by which 16 bits of one sample or one word are divided into upper 8 bits and lower 8 bits, these 8 bits are set to one symbol, respectively, and the parity data or the like for error correction by, for example, the CIRC is added on such a symbol unit basis or the scrambling process is executed.

The subcodes in the channels P to W based on the existing CD standard (called ordinary subcodes) are supplied from an input terminal 62. The subcodes of not only Mode 1 but also Mode 2 and Mode 3 are included in the ordinary subcodes. Prepressing UDI data is supplied from an input terminal 63. The prepressing UDI data is data including the stamper-unique prepressing payload.

Prerecording UDI data is supplied from an input terminal 64. Recordable UDI data is supplied from an input terminal 65. The payloads included in each of the prerecording UDI data and the recordable UDI data are based on the data of (0x47) or (0x40) as mentioned above and are the data of all "1". Further, a frame sync is supplied from an input terminal 66. The data from the input terminals 62, 63, 64, and 65 is supplied to input terminals (a, b, c, and d) of a switching circuit 68, respectively. The data selected by the switching circuit 68 is converted into data in a frame format of the subcode by a subcode encoder 70. A switching signal from a switching signal generator 71 is supplied to the switching circuit 68 and the subcode encoder 70.

The switching signal generator 71 generates the switching signal on the basis of an instruction signal from a controller (shown by a CPU in the diagram) for controlling the frame sync and the whole mastering apparatus. As mentioned above, the position of the UDI area is set to the fixed position on the disc and the position where the UDI data (subcode of Mode 7) is recorded in the UDI area is also fixed. The frame sync is used for setting the interval or the like in the case of the multiple-writing into a predetermined value. The subcode encoder 70 converts the data extracted to an output terminal (e) of the switching circuit 68 in accordance with the switching signal into data in a subcode format.

In the data format shown in FIG. 10A, the sync bits, control bits, address bits, and UDI index can be recorded by the recording method for the reflective film or can be also recorded as a concave/convex pattern by prepressing. Since the CRC bits are calculated in accordance with the payloads which are recorded, they cannot be recorded by prepressing. As shown in AUX (refer to FIG. 14) mentioned above, by designating the values of 16 bits in the payload, it is also possible to prevent the generation of CRC errors even if all of the inherent CRC bits are equal to "1".

The main data from the CIRC encoder 67 and an output of the subcode encoder 70 are mixed by an adder 69. An output of the adder 69 is supplied to an EFM modulator 73 and the symbol of 8 bits is converted into data of 14 channel bits in accordance with a conversion table. An output of the EFM modulator 73 is supplied to the adder 74. The frame sync from the input terminal 66 is supplied to the adder 74. The recording signal in the frame format mentioned above is generated from the adder 74. This recording signal is supplied to the light modulator 52 and the photoresist on the glass mother disc 54 is exposed by the modulated laser beam from the light modulator 52. The glass mother disc 54 which has been recorded as mentioned above is developed and subjected to the electroforming process, thereby forming a metal master. Subsequently, a mother disc is formed from the metal master. Further, subsequently, a stamper is formed from the mother disc. An optical disc is formed by using the stamper by the method such as compression molding, injection molding, or the like. Although the optical disc is similar to the ordinary CD, the material of the reflective film is properly selected so that the UDI can be additionally recorded as mentioned above.

Figure 19:
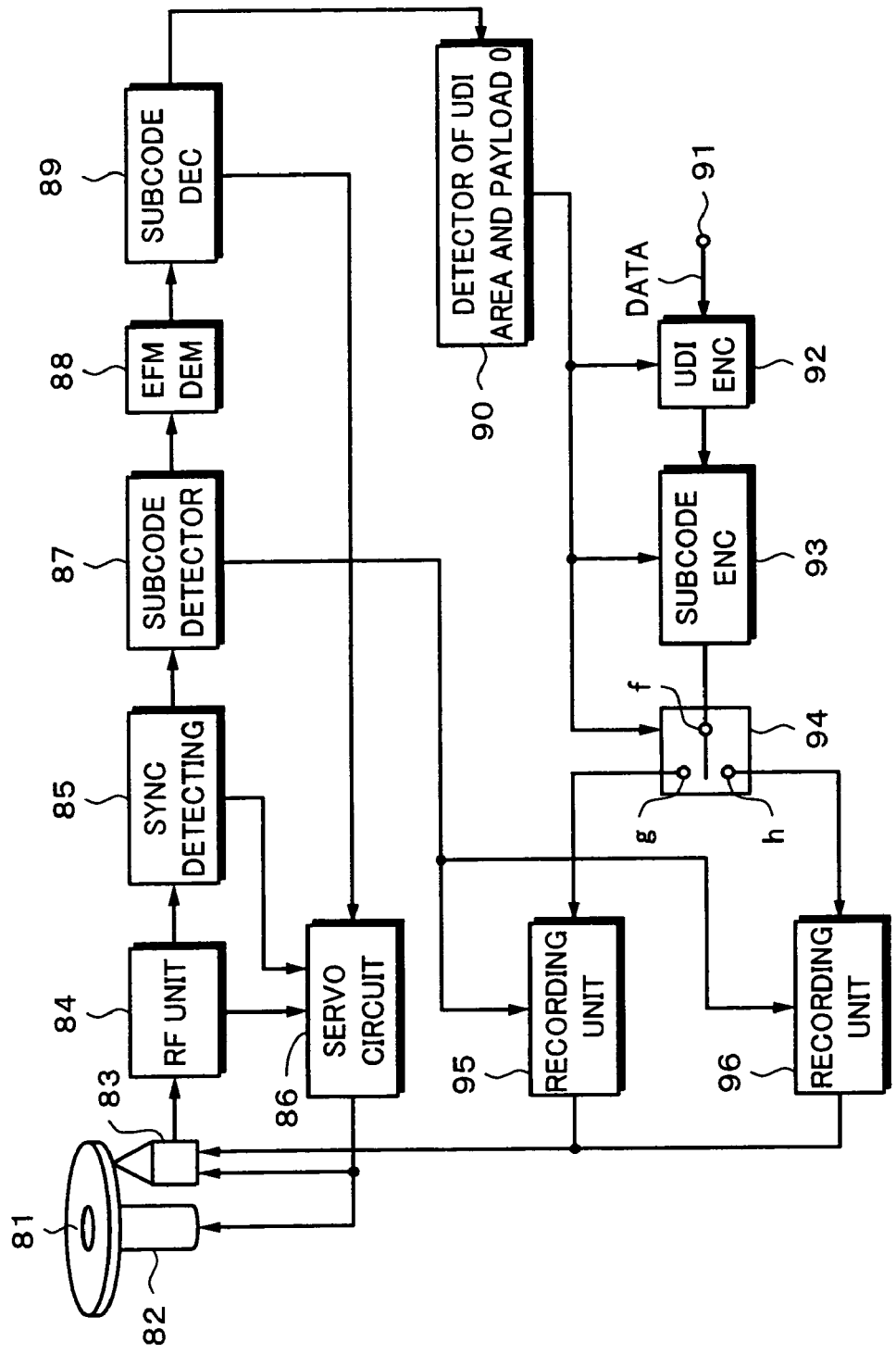
FIG. 19 is a block diagram showing an example of a construction of a UDI recording apparatus according to an embodiment of the invention.

FIG. 19 shows an example of a construction of a recording/reproducing apparatus for additionally recording the UDI data onto the optical disc formed by the mastering and stamping mentioned above. As UDI data which is additionally recorded, there are both of the prerecording payload and the recordable payload. According to the construction of FIG. 13, both of them can be recorded. However, it is not always necessary that both of them can be recorded but it is also possible to enable only either one of them to be recorded.

In FIG. 19, reference numeral 81 denotes a disc formed by the mastering and stamping steps; 82 a spindle motor for rotating the disc 81; and 83 an optical pickup for reproducing a signal recorded on the disc 81 and recording the UDI thereon. The optical pickup 83 comprises: an optical system such as semiconductor laser, objective lens, and the like for irradiating a laser beam onto the disc 81; a detector for detecting return light from the disc 81; a focusing and tracking mechanism; and the like. A laser power is switched in accordance with the recording mode or the non-recording mode. In the recording mode, the laser of a power necessary for causing a change in reflectance in the reflective film is used. In the non-recording mode, the laser of a power necessary for reading out information recorded on the disc 81 is used. Further, the optical pickup 83 is sent in the radial direction of the disc 81 by a sled mechanism (not shown).

Output signals from, for example, a 4-split detector of the optical pickup 83 are supplied to an RF unit 84. The RF unit 84 arithmetically operates the output signals of four detectors of the 4-split detector, thereby forming a reproduction (RF) signal, a focusing error signal, and a tracking error signal, respectively. The reproduction signal is supplied to a sync detecting unit 85. The sync detecting unit 85 detects a frame sync added to the head of each frame. The detected frame syncs, the focusing error signal, and the tracking error signal are supplied to a servo circuit 86. The servo circuit 86 controls the rotating operation of the spindle motor 82 and controls a focusing servo and a tracking servo of the optical pickup 83 on the basis of a reproduction clock of the RF signal.

The main data which is outputted from the frame sync detecting unit 85 is supplied to an EFM demodulator 88 through a subcode detector 87 and subjected to an EFM demodulating process. The main digital data from the EFM demodulator 88 is extracted to an output terminal (not shown) as necessary. The subcode data from the EFM demodulator 88 is supplied to a subcode decoder 89. The subcode decoder 89 collects the 8-bit subcodes of each frame of the number of 98 frames, thereby constructing data of the subcode frame.

A detector 90 of the UDI area and payload 0 is connected to an output of the subcode decoder 89. The detector 90 detects the data of payload 0 from the payload area and makes error correction based on the multiple-recording of the data of payload 0. The construction of the UDI area can be recognized from the data of payload 0 and the recording position of the prerecording payload or the recordable payload can be recognized. Information from the detector 90 is supplied to a UDI encoder 92 and a subcode encoder 93.

Data from an input terminal 91 is supplied to the UDI encoder 92. The UDI encoder 92 generates the payload of the UDI. It is converted into the format of the subcode by the subcode encoder 93. An output of the subcode encoder 93 is supplied to an input terminal (f) of a switching circuit 94. The switching circuit 94 is controlled by an output of the detector 90. In the case of recording the prerecording payload, an output terminal (g) is selected. In the case of recording the recordable payload, an output terminal (h) is selected.

The data of the prerecording payload from the output terminal (g) of the switching circuit 94 is supplied to a recording unit 95. The data of the recordable payload from the output terminal (h) is supplied to a recording unit 96. The subcode from the subcode detector 87 is supplied to the recording units 95 and 96. Outputs of the recording units 95 and 96 are supplied to the optical pickup 83. In the case where the subcode recorded as 0x47 (or 0x40) is changed to 0x70 (or 0x00), the recording units 95 and 96 generate outputs for changing the laser power into the recording power.

The construction shown in FIG. 19 can be changed to a possible construction in accordance with whether the whole one frame of 98 bits is recorded or a part thereof is recorded by prepressing. Further, if the UDI area has been set to the fixed position, since the prerecording position and the layout of the recordable area can be known, it is possible to determine the recording position by referring to the reproduced subcode (time code) and record the data to the determined position.

The invention is not limited to the foregoing embodiments or the like of the invention but many variations and modifications are possible within the scope of the invention without departing from the spirit of the invention. For example, the UDI area is not limited to the program area of the disc but can be provided in the lead-in area. The UDI is an example of the data which is multiple-written and the invention can be also applied to the case of multiple-writing data other than the UDI.

The invention can be also applied to, for example, an optical disc of multisession for recording data in the format of the CD-DA and data in the format of the CD-ROM. As information which is recorded to the optical disc, various data such as audio data, video data, still image data, character data, computer graphics data, game software, computer program, and the like can be recorded. Further, the invention can be also applied to, for example, a DVD video and a DVD-ROM.

DESCRIPTION OF REFERENCE NUMERALS

2 REFLECTIVE FILM
51 LASER
53 OPTICAL PICKUP
54 GLASS MOTHER DISC
62 INPUT TERMINAL OF ORDINARY SUBCODE
63 INPUT TERMINAL OF PREPRESSING UDI DATA
64 INPUT TERMINAL OF PRERECORDING UDI DATA
65 INPUT TERMINAL OF RECORDABLE UDI DATA
81 DISC FORMED BY MASTERING
S1 FORM MASTERING MASTER
S2 FORM METAL MASTER
S3 FORM MOTHER
S4 FORM STAMPER
S5 FORM DISC SUBSTRATE
S6 FORM REFLECTIVE FILM AND PROTECTIVE FILM
S7 RECORD ONTO REFLECTIVE FILM

The invention claimed is:

1. An optical recording medium configured to provide data structured per sub-code frame for cooperating with a recording/reproducing device to provide managed access to the structured data, and, having two or more groups of sub-code frames spirally or concentrically recorded thereon, comprising:
a first and second subcode data recorded in a plurality of locations on the medium, identical first and second subcode data being repetitively recorded at locations in a circumferential direction at substantially equal distances apart from each other around an entire circumference of the medium, including data for uniquely identifying the recording medium, the intervals at which the first and second subcode data are recorded corresponding to a linear velocity for accessing the medium via the recording/reproducing device.

2. The recording medium according to claim 1, wherein the second subcode data is expressed on the recording medium as pre-pressed pits and lands which serve as a component of a unique disc identifier (UDI) which identifies a mastering apparatus.

3. The recording medium in accordance with claim 1, wherein the first subcode data is expressed on the recording medium as a variance in reflectance of a reflective film of the recording medium, the variance being a component of a unique disc identifier (UDI) to identify the recording medium.

4. The recording medium in accordance with claim 1, wherein the recording medium is a disc encoded with error detection and error correction data.

5. The recording medium in accordance with claim 1, wherein the subcode is provided in a compact disc (CD) format.

6. The recording medium in accordance with claim 5, wherein the repetitive recording is five repetitions at intervals of twelve sub-code frames.

7. The recording medium of claim 5, wherein the first and second subcode data are recorded in a Q channel of the two or more groups of sub-code frames.

8. The recording medium of claim 1, wherein the medium is rectangular and the second subcode data is arranged on one side of the medium at regular intervals.

9. A recording/reproducing device configured to access a recording medium which includes data structured per subcode frame, and, having two or more groups of sub-code frames spirally or concentrically recorded thereon, comprising:

a read/write unit configured to access a first and second subcode data recorded in a plurality of locations on the medium, identical first and second subcode data being repetitively recorded at locations in a circumferential direction at substantially equal distances apart from each other around an entire circumference of the medium, including data for uniquely identifying the recording medium, the intervals at which the first subcode data are recorded corresponding to a linear velocity for accessing the medium.

10. The recording/reproducing device according to claim 9, wherein the recording/reproducing device identifies the second subcode data as pre-pressed pits and lands.

11. The recording/reproducing device medium in accordance with claim 9, wherein the read/write unit writes the first subcode data to the recording medium as a variance in reflectance of a reflective film of the recording medium to identify the recording medium.

12. The recording/reproducing device in accordance with claim 11, wherein the first subcode is provided to a Q channel of the two or more groups of sub-code frames, the sub-code frames being provided in a compact disc (CD) format.

* * * * *